United States Patent [19]

Tsai

[11] Patent Number: 5,413,523
[45] Date of Patent: May 9, 1995

[54] DRIVING MECHANISM FOR MOVING TABLE

[76] Inventor: A-Po Tsai, P.O. Box 1750, Taichung, Taiwan, Prov. of China

[21] Appl. No.: 159,467

[22] Filed: Nov. 30, 1993

[51] Int. Cl.$^6$ ............................................. F16H 19/06
[52] U.S. Cl. ...................... 451/364; 451/404; 451/411; 269/73; 269/55; 269/65
[58] Field of Search ............... 51/216 R, 230, 240 R, 51/240 GB, 216 ND, 216 H; 269/55, 56, 58, 60, 63, 65, 73; 451/364, 403, 404, 411

[56] References Cited

U.S. PATENT DOCUMENTS

| | | | |
|---|---|---|---|
| 4,579,321 | 4/1986 | Kawano | 269/73 |
| 5,207,115 | 5/1993 | Takei | 269/73 |

Primary Examiner—Bruce M. Kisliuk
Assistant Examiner—Eileen P. Morgan

[57] ABSTRACT

A grinding machine includes a working table slidably engaged on the base, an opening is formed in the base, a belt is extended through the opening, a rotating wheel is coupled to the belt for driving the belt, another belt is extended between the working table and the base and includes two ends in which one is fixed to the working table and the other is fixed to a block, a bolt is engaged with the working and one of the blocks for moving the blocks toward each other or away from each other so as to adjust the tension of the belt. The belts are shielded by the working table and will not be splashed by cooling oil used in the grinding machine.

1 Claim, 4 Drawing Sheets

DRIVING MECHANISM FOR MOVING TABLE

BACKGROUND OF THE INVENTION

1. Field of the Invention The present invention relates to a moving table, and more particularly to a driving mechanism for a moving table for use with a grinding machine.

2. Description of the Prior Art

Belts, particularly the V-belts are widely used as the driving mechanisms or transmission mechanisms for machine tools, such as the grinding machines; however, for typical grinding machines, a large amount of cooling oil will be used, and the belts are normally extended through the working table in order to couple the parts above and below the working table, however, the belts are exposed and will be splashed by the cooling oil and will thus be easily damaged.

The present invention has arisen to mitigate and/or obviate the afore-described disadvantages of the conventional transmission mechanisms for grinding machines.

SUMMARY OF THE INVENTION

The primary objective of the present invention is to provide a working table for a grinding machine which includes one or more driving belts that are well protected and prevented from being splashed by the cooling oil.

In accordance with one aspect of the invention, there is provided a working table for a grinding machine comprising a base including a pair of channels in parallel with each other, a working table slidably engaged on the channels, bearing means engaged between the channels and the working table for slidingly supporting the working table, a space formed between the channels and including two ends each having a first wheel rotatably supported therein, an opening formed in one of the ends of the space, a first belt engaged over the first wheels and including two ends, a shaft fixed in one of the first wheels, a second wheel fixed on the shaft and rotating in concert with the shaft, a rod rotatably provided below the base and including two ends, a rotating wheel secured to a first of the ends of the rod and a third wheel secured to a second of the ends of the rod, a second belt extended through the opening of the base and engaged over the third wheel and the second wheel, a first block fixed to the working table, a bolt engaged through the first block and including a first end threadedly engaged with the working table and a second end, a second block threadedly engaged with the second end of the bolt, the ends of the first belt being fixed to the blocks respectively, the second block being moved toward or away from the first block when the bolt is rotated in order to adjust tension of the first belt.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
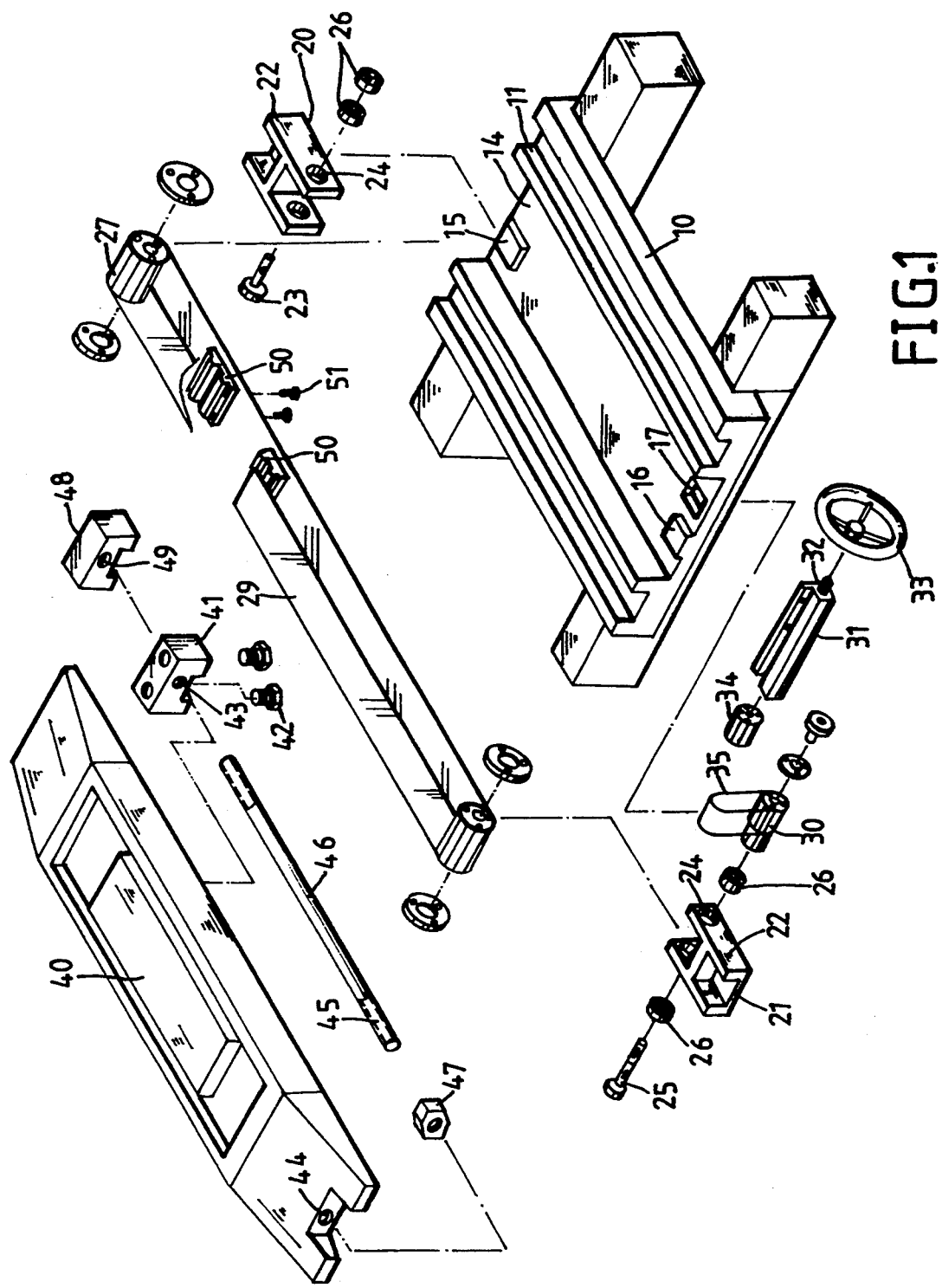
FIG. 1 is an exploded view of a driving mechanism in accordance with the present invention.

Referring to the drawings, the driving mechanism in accordance with the present invention is provided for a working table which is used in a grinding machine and provided for driving a belt transmission system, the driving mechanism comprises a base 10 including a pair of channels 11 parellel with each other for receiving ball bearings 12, a space 14 formed between the channels 11 and including two end portions each having a protrusion 15, 16 formed thereon, an opening 17 formed beside the protrusion 16, a bracket 20, 21 fixed on each of the protrusions 15, 16 and including two walls 22 each having a hole 24 formed therein for receiving a bearing 26, each of the brackets 20, 21 including a shaft 23, 25 rotatably supported therein by the bearings 26, a wheel 27, 28 fixed on each of the shafts 23, 25 and a belt 29 engaged over the wheels 27, 28 and including two ends, another wheel 30 further fixed on the shaft 25 and rotated in concert with the wheel 28, the driving mechanism includes a beam 31 disposed below the base 10 and including a rod 32 rotatably engaged therein, a rotating wheel 33 fixed on one end of the rod 32 and a wheel 34 rotatably secured on the other end of the rod 32, and a belt 35 engaged over the wheels 30 and 34 such that the belt 29 can be actuated by the rotating wheel 33 via the belt 35 and the shaft 25, the belt 35 is extended through the opening 17.

A working table 40 is slidably supported on the base 10 and engaged with the ball bearings 12 such that the working table 40 is movable along the longitudinal direction of the channels 11 of the base 10, a block 41 fixed to the bottom of the working table 40 by screws 42 and including an aperture 43 formed therein, the working table 40 including a screw hole 44 formed in one end thereof for engaging with the thread 45 of a bolt 46, a nut 47 threaded with the bolt 46 and engaged with the working table for fixing the bolt 46 to the working table 40, the bolt 46 being extended through the aperture 43 of the block 41 and another block 48 including a screw hole 49 formed therein for threadedly engaging with the bolt 46, the two ends of the belt 29 are fixed to the blocks 41, 48 by fixing members 50 and screws 51, the block 48 can be caused to move toward or away from the block 41 when the bolt 46 is rotated such that the tension of the belt 29 can be adjusted and such that the belt 29 can be replaced.

In operation, when the rotating wheel 33 is rotated, the belt 35 can be rotated and the belt 29 can thus be caused to rotate by the wheel 28, whereby, the blocks 41, 48 and the working table 40 can thus be caused to move along the longitudinal direction of the channels.

Figure 2:
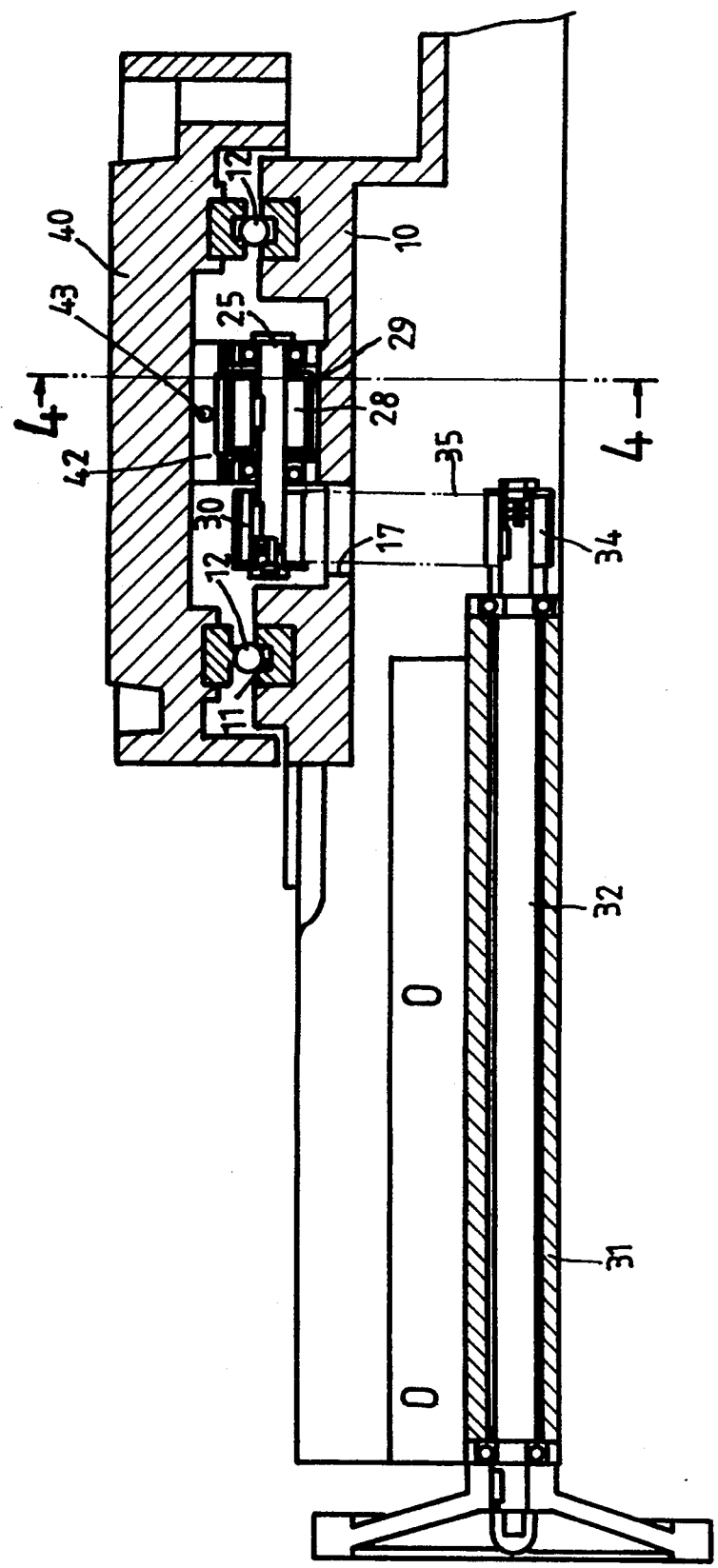
FIG. 2 is a cross sectional view of the driving mechanism, taken along lines 2—2 of FIG. 4.
Figure 3:
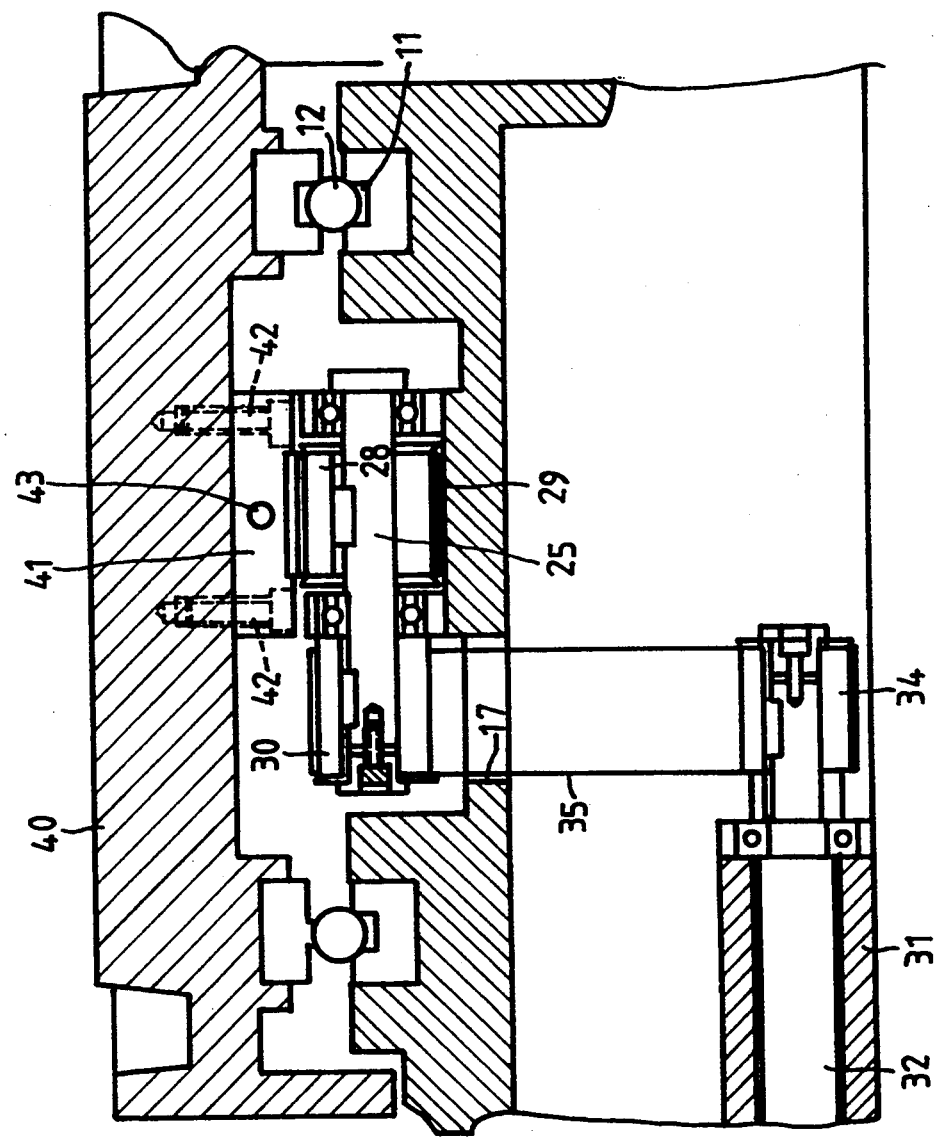
FIG. 3 is an enlarged partial cross sectional view showing part of the elements as shown in FIG. 2.
Figure 4:
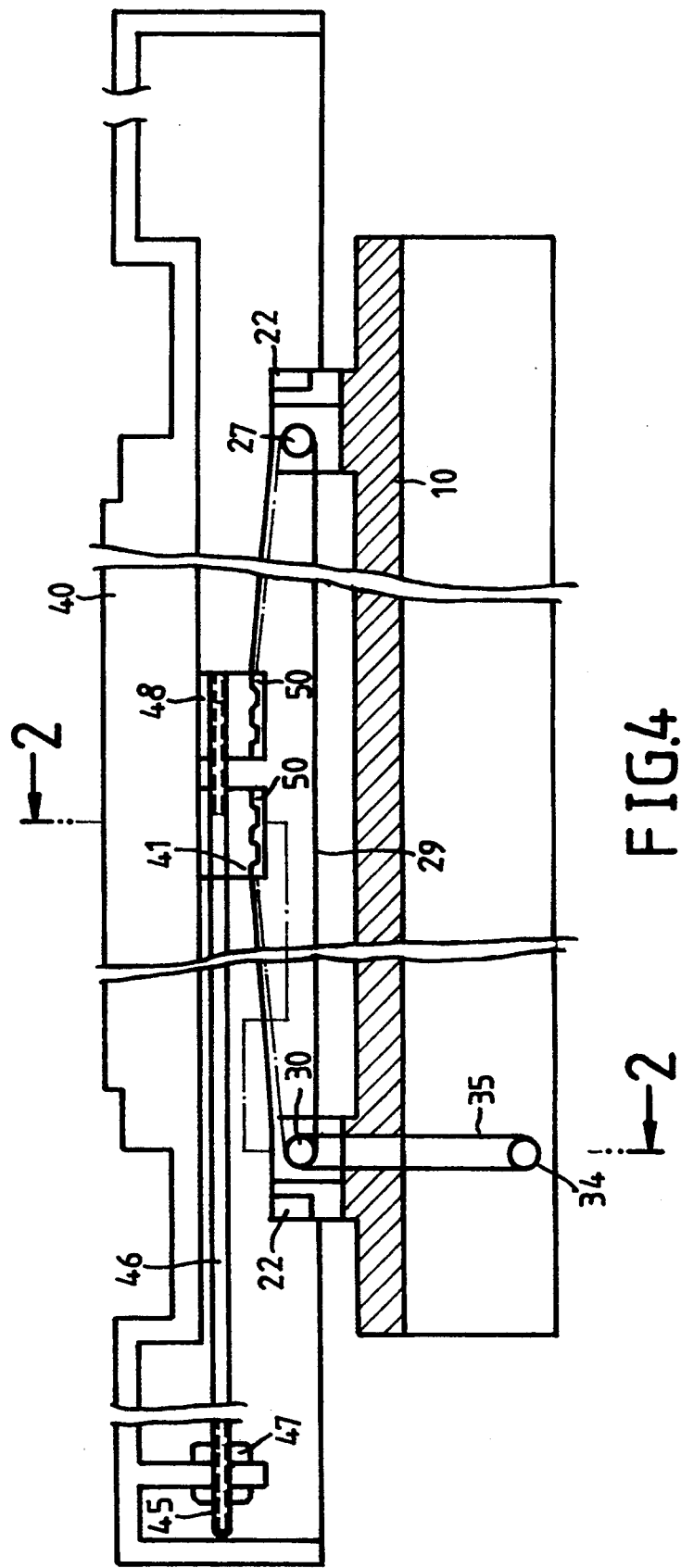
FIG. 4 is a cross sectional view taken along lines 4—4 of FIG. 2.

As best shown in FIG. 2, the working table 40 is engaged over the base 10 and the channels 11 are located below the working table 40 such that the opening 17 of the base 10 and the belt 35 which is extended through the opening 17 are suitably shielded or protected by the working table 40, contaminants or cooling oil is prevented from entering into the space 14 of the base 10 such that the belts 29 and 35 will not be splashed by the cooling oil and will not be easily damaged.

Accordingly, the driving mechanism for a working table in accordance with the present invention includes a driving belts that are well protected and prevented from being splashed by the cooling oil.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A driving mechanism comprising a base including a pair of channels in parallel with each other, a working table slidably engaged on said channels, bearing means engaged between said channels and said working table for slidingly supporting said working table, a space formed between said channels and including two ends each having a first wheel rotatably supported therein, an opening formed in one of said ends of said space, a first belt engaged over said first wheels, said first belt including two end portions, a shaft fixed in one of said first wheels, a second wheel fixed on said shaft and rotating in concert with said shaft, a rod rotatably provided below said base and including two ends, a rotating wheel secured to a first of said ends of said rod and a third wheel secured to a second of said ends of said rod, a second belt extended through said opening of said base and engaged over said third wheel and said second wheel, a first block fixed to said working table, a bolt engaged through said first block and including a first end threadedly engaged with said working table, said bolt including a second end, a second block threadedly engaged with said second end of said bolt, said end portions of said first belt being fixed to said blocks respectively, said second block being moved toward or away from said first block when said bolt is rotated in order to adjust tension of said first belt, said first belt being engaged between said channels and received in said space, and said second belt being engaged through said opening of said space and being shielded by said working table such that said first belt and said second belt are prevented from being contaminated by contaminants.

* * * * *